(12) United States Patent
Putnam

(10) Patent No.: US 11,439,138 B2
(45) Date of Patent: Sep. 13, 2022

(54) DEVICE FOR SWATTING, CATCHING, AND REMOVING FLIES, BUGS AND INSECTS

(71) Applicant: Scott Putnam, Dubuque, IA (US)

(72) Inventor: Scott Putnam, Dubuque, IA (US)

( * ) Notice: Subject to any disclaimer, the term of this patent is extended or adjusted under 35 U.S.C. 154(b) by 307 days.

(21) Appl. No.: 16/565,441

(22) Filed: Sep. 9, 2019

(65) Prior Publication Data
US 2020/0077637 A1 Mar. 12, 2020

Related U.S. Application Data

(60) Provisional application No. 62/729,422, filed on Sep. 11, 2018.

(51) Int. Cl.
*A01M 3/02* (2006.01)
*B25G 1/04* (2006.01)

(52) U.S. Cl.
CPC .................. *A01M 3/02* (2013.01); *B25G 1/04* (2013.01)

(58) Field of Classification Search
CPC .......... A01M 3/02; A01M 3/00; A01M 3/022; A01M 3/04; A01K 29/00; A47J 43/00; A01B 1/10
See application file for complete search history.

(56) References Cited

U.S. PATENT DOCUMENTS

| | | | | |
|---|---|---|---|---|
| 1,228,701 A * | 6/1917 | Rochfort | .................. | A01M 3/02 43/137 |
| 1,638,690 A * | 8/1927 | Hake | ........................ | A01M 3/02 43/134 |
| 4,627,128 A * | 12/1986 | Shea | ........................ | B08B 1/00 15/104.001 |
| 4,793,094 A * | 12/1988 | Weaver | .................... | A01M 3/02 43/137 |
| 2,624,149 A | 12/1991 | Atkinson | | |
| 5,207,018 A | 5/1993 | Reaver | | |
| 5,536,055 A * | 7/1996 | Kohn | .................... | A01K 1/0114 294/1.3 |
| 5,738,399 A * | 4/1998 | Mitchell | .............. | A01K 1/0114 294/1.3 |
| 6,412,841 B1 * | 7/2002 | Loraas | ..................... | A01B 1/00 294/51 |
| 2017/0347639 A1 | 12/2017 | Sapienza | | |

OTHER PUBLICATIONS

Valerisa (Amazon), https://www.amazon.com/dp/B07FXJJX2M/ref=sspa_dk_detail_7?psc=1&pd_rd_i=B07FXJJX2M&pd_rd_w=odICL&pf_rd_p=8a8f3917-7900-4ce8-ad90-adf0d53c0985&pd_rd_wg=98xju&pf_rd_r=JMNBJ9J91CX0HHGMSPVD&pd_rd_r=dd6aae79-c27d-4fe4-a45c-9a6372665cfd Webpage accessed Aug. 2, 2019.

* cited by examiner

*Primary Examiner* — Timothy D Collins
*Assistant Examiner* — Maria E Graber
(74) *Attorney, Agent, or Firm* — Daniel M. Northfield

(57) ABSTRACT

The present invention is a device for removing flies and other flying or crawling organisms, which allows the user to swat and/or scoop for capture and removal. The embodiment is a handheld mobile device for swatting and subsequently scooping and/or trapping and/or holding insects, bugs, flies, spiders or other organisms from undesired places, then releasing or disposing. The invention may include a handle, swatting mechanism, scoop, reservoir, beveled or tapered scoop edge, openings in handle for structural integrity, storage, with swatting/scooping mechanism, which are configured as follows: opposing end of handle is housed a loop for storage, handle embodies textured grip and comfort configuration, swatting/scooping embodiment at adjacent end of handle.

10 Claims, 12 Drawing Sheets

DEVICE FOR SWATTING, CATCHING, AND REMOVING FLIES, BUGS AND INSECTS

FIELD OF THE INVENTION

The invention relates generally to a device for swatting, catching, and removing flies, bugs, arachnids, and insects. This invention claims the benefit of Provisional application 62,729,422 filed Sep. 11, 2018.

BACKGROUND

Currently there are a number of solutions for removing flies and other unwanted bugs, insects, arachnids or organisms from any dwelling. Some of these solutions attempt to kill them by method of swatting or trapping, but these solutions fail to meet the needs of the industry because they do not provide an adequate method for containing and disposing of these unwanted and sometimes dangerous organisms from a safe distance. These methods require finding other materials to help scoop up or grab them which often places them in compromising situations by becoming too close, and places them in harm's way resulting in stings or bites, such as from a bee, scorpion, or spider. Other solutions attempt to use mechanical methods, vacuum methods or poisons to rid a home of these pests, but these solutions are similarly unable to meet the needs of the industry because they are cumbersome, bulky, require specialized skills, or can be dangerous to human health. Still other solutions seek to trap annoying or dangerous crawling or flying organisms by setting up large traps, strips, or other chemical or mechanical traps, but these solutions also fail to meet industry needs because they are not quick or convenient, and often messy or contain foul odors, in addition to being dangerous to humans or animals.

SUMMARY OF THE INVENTION

It is desirable to have a mechanism for safely removing flies and other annoying or unwanted bugs, insects, or arachnids flying or crawling from inside or outside the home, or other dwelling, which/that allows the user to swat and then scoop and remove flies and other organisms. Furthermore, it is desirable to have a device that is lightweight, easy to store, houses the unwanted pests at a safe distance and contains organism for easy disposal. Still further, it is desirable to have a device which can be used to swat or simply scoop with little resistance or effort and without the need to find an external device to remove the live or dead organism from floor, countertop, or other surface. The disclosed device advantageously fills these needs and addresses the aforementioned deficiencies by providing a handled fly swatter with convenient built in scoop/trapping mechanism for killing and/or easily removing the live or dead organisms. The present invention is an improvement on the traditional fly swatter by providing an additional benefit including but not limited to a built-in method for scooping, removing, and disposing of the organisms in a quick and safe manner, while being able to see it from any angle inside the housing.

Disclosed is a fly swatter with built-in scoop, or reservoir, which is made up of the following components: a handle of any length, a swatting mechanism of any size or shape with a flat tapered scoop/reservoir housing enclosure at the end, two adjacent sides to connect two or more swatting surfaces, a bottom piece to connect all sides, holes or openings to reduce resistance, and a loop for hanging. These components are connected as follows: the scoop/housing with beveled edge and wedge design is attached to the handle, which contains a loop at the end opposite to the scoop/housing.

The device may also have one or more of the following: a U-shaped head at top or bottom of structure, a closure mechanism to trap organism inside, a small broom or lever incorporated into mechanism to sweep organism into the housing, mechanism with a mechanical arm to assist with capturing the organisms, scoop embodiment may include but not limited to tapered housing, bulbous housing, sealable housing, coupling for storage of organisms, protrusion of beveled edge for larger surface area to scoop, handle with solid construction or supported structure which may or may not include enveloping holes or openings to use less material while maintaining structural integrity, magnetic enclosure with lid, magnetic storage configuration, larger or smaller handle, loop for storage/hanging may be any size or shape, may include a clip, or other device for coupling or storing. The housing may be any shape or size scooping or trapping mechanism coupled with handle and method for trapping insects or other organisms, may be solid surface or may include any size or shape holes/openings in handle or scoop and may be decorative in nature or a specific shape for functional purposes. Embodiment may or may not include but not limited to channels, slats, or cavities inside the scoop housing (head) to assist in keeping organisms trapped inside. In addition, embodiment may have two sided option-one at each end: one end includes a device for swatting and the adjacent end designed for scooping or trapping. Embodiment may be made of but not limited to the following materials: plastic, polymers, polyethylene, ABS, PVC, composite, wood, metal, wire, or any other variations known in the art.

The disclosed device is unique when compared with other known devices and solutions because it provides: (1) a quick and easy method for swatting and trapping flies, bees, or other unwanted pests; (2) allows the user to quickly and easily scoop and/or trap and contain the fly, bee, spider or any other pest from a safe distance providing a strong measure of safety while saving time by bypassing the inconvenience of searching for other tools; and (3) allows the user to easily dispose of the organism, dead or alive in any manner of their choosing using just one tool to complete the process of capture and removal of flies, spiders, bees, or other insects and organisms; (4) saves manufacturing costs of other more cumbersome or unhealthy methods of removing bugs and insects from a dwelling or anywhere they are not wanted.

The disclosed device is superior and unique in that it is structurally different from other known devices or solutions. More specifically, the device is unique due to the presence of: (1) a dual-sided fly swatter creating a built-in scooping mechanism; (2) a beveled edge and surface area assisting the user in scooping the fly or other organism after swatting; (3) tapered and enclosed housing for trapping and containing the organism; (4) enhanced handle with one or more openings for enhanced stability, length, and structural integrity; (5) a series of openings allowing for air flow and visual confirmation of capture and release.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Device for swatting, catching, and removing flies, bugs, insects, or any other organisms may, however, be embodied in many different forms and should not be construed as being limited to the embodiments set forth herein; rather, these embodiments are provided by way of illustration only and so that this disclosure will be thorough, complete and fully convey understanding to those skilled in the art.

In an embodiment, an insect remover comprises an insect remover, comprising a dual-sided top part with a first side and a second side; wherein at least one of the first side and the second side has holes throughout the respective side; wherein the first side includes a beveled edge on both a top edge and a bottom edge wherein the bottom edge is connected to a handle; wherein the second side includes a beveled edge on a bottom edge connected to the handle; wherein the first side and the second side comprise a tapered and enclosed housing; and a handle with multiple holes through the handle. In an embodiment, the insect remover has holes throughout both the first side and the second side. In an embodiment, the insect remove includes a divider support between the first side and second side, wherein the divider support divides an opening between the first side and the second side into a first chamber and a second chamber. In an embodiment, the divider support is removable. In an embodiment, the handle is removable. In an embodiment, the first side is of a geometric shape of a solid, non-porous structure without holes. In an embodiment, the first side is flat and the second side is rounded, and the second side has a geometric shape. In an embodiment, the handle includes a structural I-beam protrusion. In an embodiment, a divider support is connected between the first side and the second side, and separates the first side and second side into two separate chambers. In an embodiment, two divider supports are connected between the first side and the second side, and separate the first side and the second side into three separate chambers. In an embodiment, a coupling mechanism secures the handle to the first side and the second side. In an embodiment, multiple protrusions are located along a top edge of the first side and second side. In an embodiment, saw-tooth edges are located along a top edge of the first side and the second side. In an embodiment, a removable fitted coupling couples the handle with the first side and the second side. In an embodiment, the first side is slightly longer on a top edge than the second side, wherein the first side protrudes upwardly on the top edge over the second side. In an embodiment, the first side and second side are of equal height. In an embodiment, the handle is a telescoping handle such that it is extendable and retractable so that the insect remover can be raised and lowered at will to reach to a room ceiling.

BRIEF DESCRIPTION OF THE DRAWINGS

FIG. 6A shows a front view, FIG. 6B shows a back view, and FIG. 6C shows a side view.

DETAILED DESCRIPTION

The present invention is directed to device for swatting catching and removing flies bugs and insects.

In its most complete version the device is made up of the following components: (1) a handle with textured grip; (2) coupled with a vented symmetrical or asymmetrical scoop reservoir/housing embodiment coupled with the handle, which includes a surface area and beveled edge for scooping, or removing organisms from walls, ceilings or floors; (3) at least one mechanism for hanging or otherwise storing the device including but not limited to a loop, magnetic connector and receptacle; (4) at least one channel for housing and/or trapping organisms. These components are related as follows: handle contains built-in storage loop, coupled with the scoop reservoir at the end of the handle allowing swatting of flies or other organisms from either side; built in air flow holes for viewing and reducing friction, with built-in/coupled beveled mechanism for scooping or trapping organisms. It should further be noted that: embodiment may be any size, shape, or configuration, and be made of any materials such as plastic, polymers, composites, metal, wood, or any other variation known in the art. Additionally, it may be made of one solid piece or separate pieces to be assembled.

Figure 1:
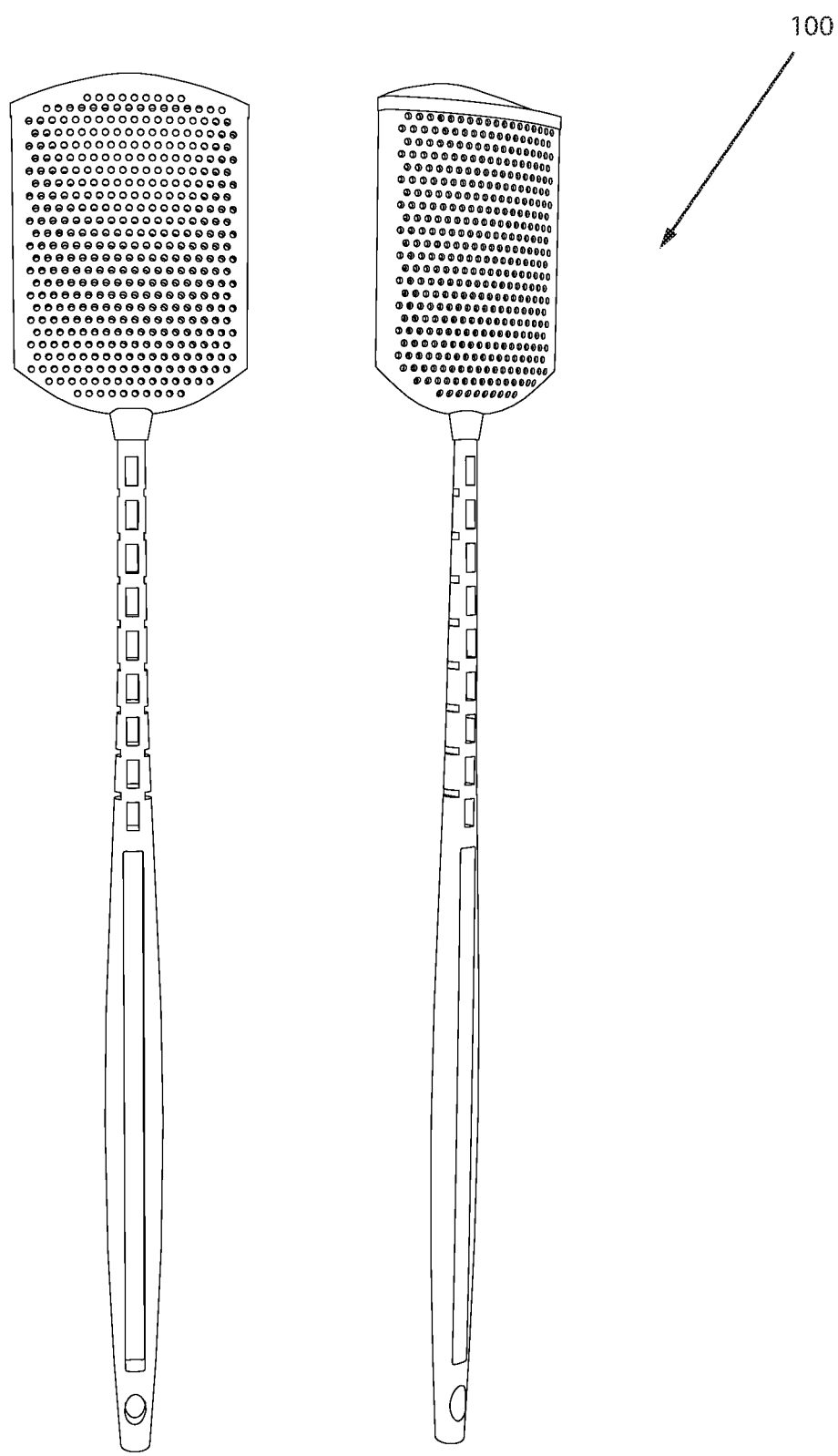
FIG. 1.—is a diagram illustrating a front view of a device for removing flies or other crawling organisms in accordance with an exemplary embodiment.

The following are elements shown in the drawings:
100—insect removal device
201—scoop edge
202—enclosure
203—handle
204—loop
205—holes
206—first side
207—second side
400—insect remover
401—first side
402—second side
410—scoop housing
501—edge
502—first side
502—second side
505—holes
600—insect remover
601—scoop
602—openings
604—first side
605—second side
700—insect remover 701—loop
702—opening
703—I-beam protrusion
704—opening
705—scoop
706—head
707—handle
901—divider supports
902—first edge
903—second edge
904—first side
905—second side
906—first chamber
907—second chamber
1000—insect remover
1001—coupling mechanism
1002—handle
1003—scooping mechanism
1100—insect remover
1101—coupling mechanism
1102—wire handle
1200—insect remover
1201—coupling mechanism
1202—coupling mechanism removed As shown in FIG. 1, a diagram is shown illustrating a top view and side view of a device insect remover 100 for removing flies and other flying or crawling organisms in accordance with an exemplary embodiment of the invention. As shown, the device 100 in FIG. 1, includes a handle, swatting mechanism of any size, scoop, reservoir, beveled or tapered scoop edge which may be any size or shape, openings in handle for structural integrity, storage, with swatting/scooping mechanism, which, generally speaking, are configured as follows: opposing end of handle is housed a loop for storage, handle embodies grip and comfort configuration, swatting/scooping embodiment at adjacent end of handle. The housing may be any shape or size scooping mechanism coupled with handle and method for trapping insects or other organisms, may include any size or shape holes in handle or scoop and may be decorative in nature or a specific shape for functional purposes. The device FIG. 1 may be comprised of a material such as but not limited to: plastic, metal, poly, polyethylene, polypropylene, ABS, composite, rubber, wood, molded plastic, foam with a fiberglass coating, or any other variation known in the art.

Figure 2:
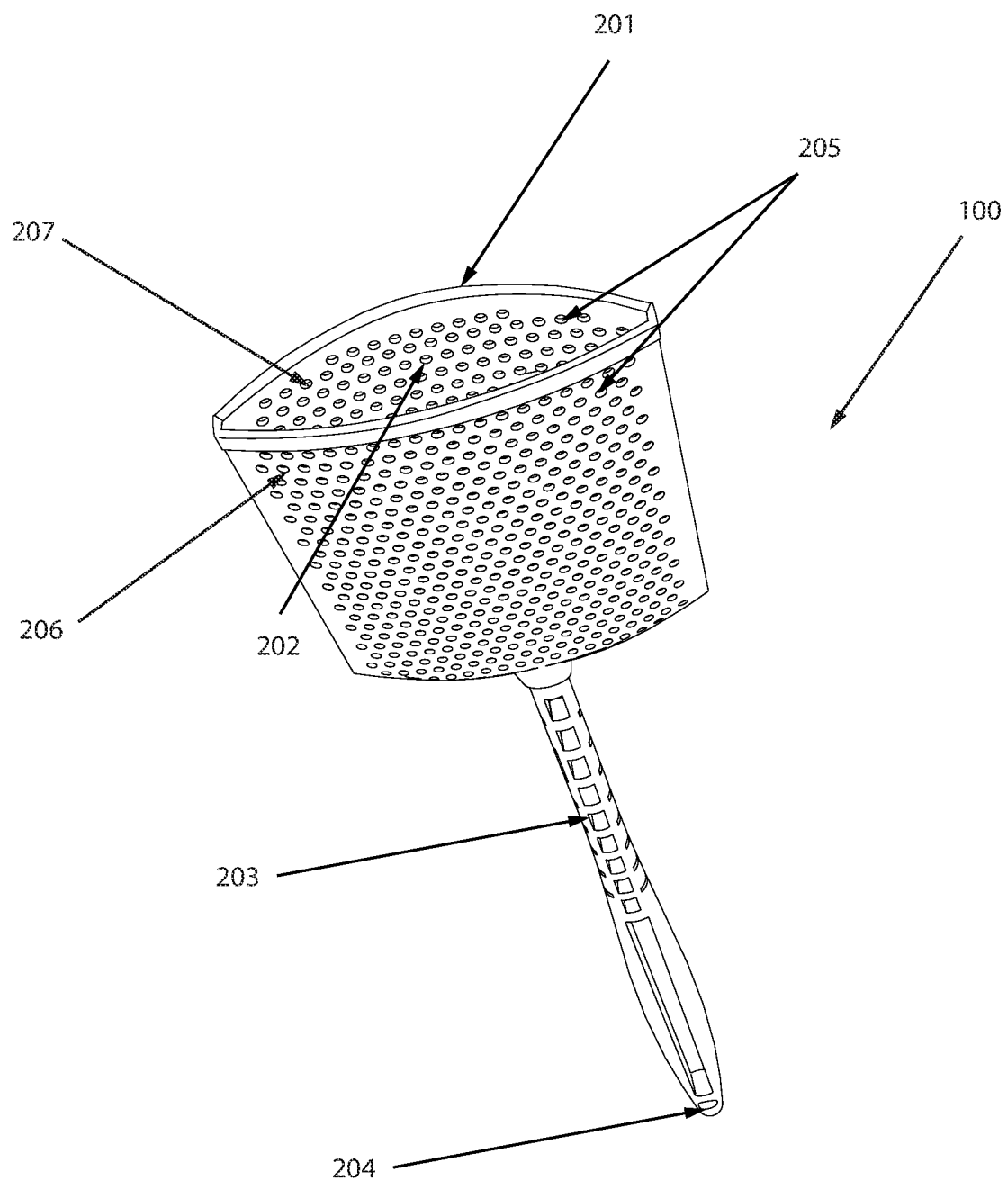
FIG. 2.—is a diagram illustrating a top view of a device for removing flies or other crawling organisms in accordance with an exemplary embodiment.

As shown in FIG. 2, the invention 100 comprises a handle 203, a first side 206, a second side 207, a tapered or beveled scoop edge 201 with openings. The beveled edge 201 is coupled with the housing scoop reservoir enclosure 202, holes 205 to allow less wind resistance, and a loop 204 for hanging the invention in a place for storage of the invention. These components are connected as follows: the scoop/housing with beveled edge 201 and wedge design is attached to the handle 203, which contains the loop 204 at the opposing end. By way of further illustration, the handle 203 may be any length and configuration including but not limited to solid or hollow, with or without openings 203. The handle 203 may or may not be removable. The handle 203 may or may not be extendable and retractable, so that the invention insect remover 100 may be extendable and retractable so that the invention can be extended to reach hard to reach areas on a high ceiling. The embodiment may be any width and any length that include the features described herein are intended to be within this disclosure and make up the overall invention, which has many different embodiments.

Figure 3:
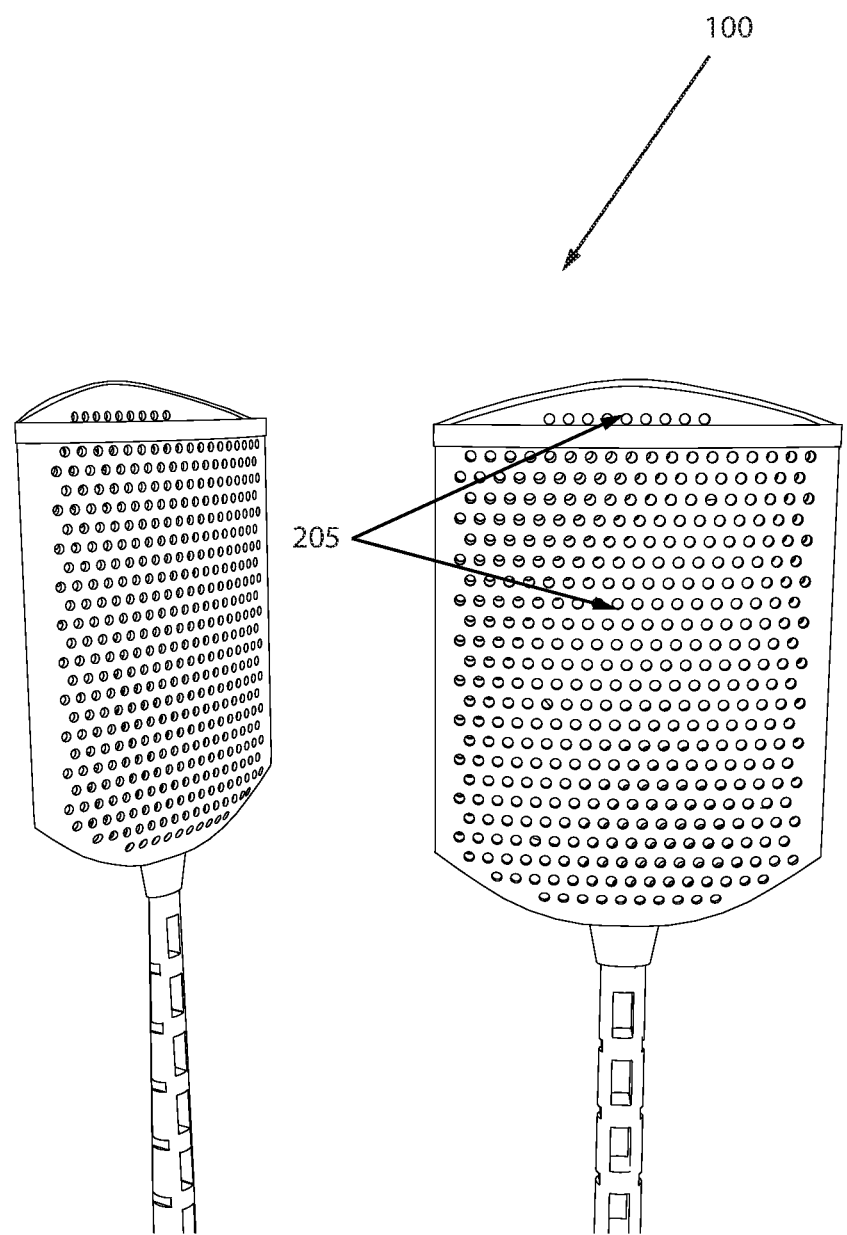
FIG. 3.—is a perspective view of the scoop/housing assembly including the associated beveled edge and openings therein.

As shown in FIG. 3, A diagram is shown illustrating a close up front view and side view of a device 100 for removing flies and other flying or crawling organisms in accordance with an exemplary embodiment of the invention. As shown, the embodiment includes holes 205 on front and back, which may be round in nature or any other shape which allows for optimum air flow. It is noted that the openings 205 may alternatively be shaped as a diamond, a circle, an oval, or a polygon, or any other variation known in the art—the shape being selected based on the desired performance.

Figures 4, 4A, 4B:
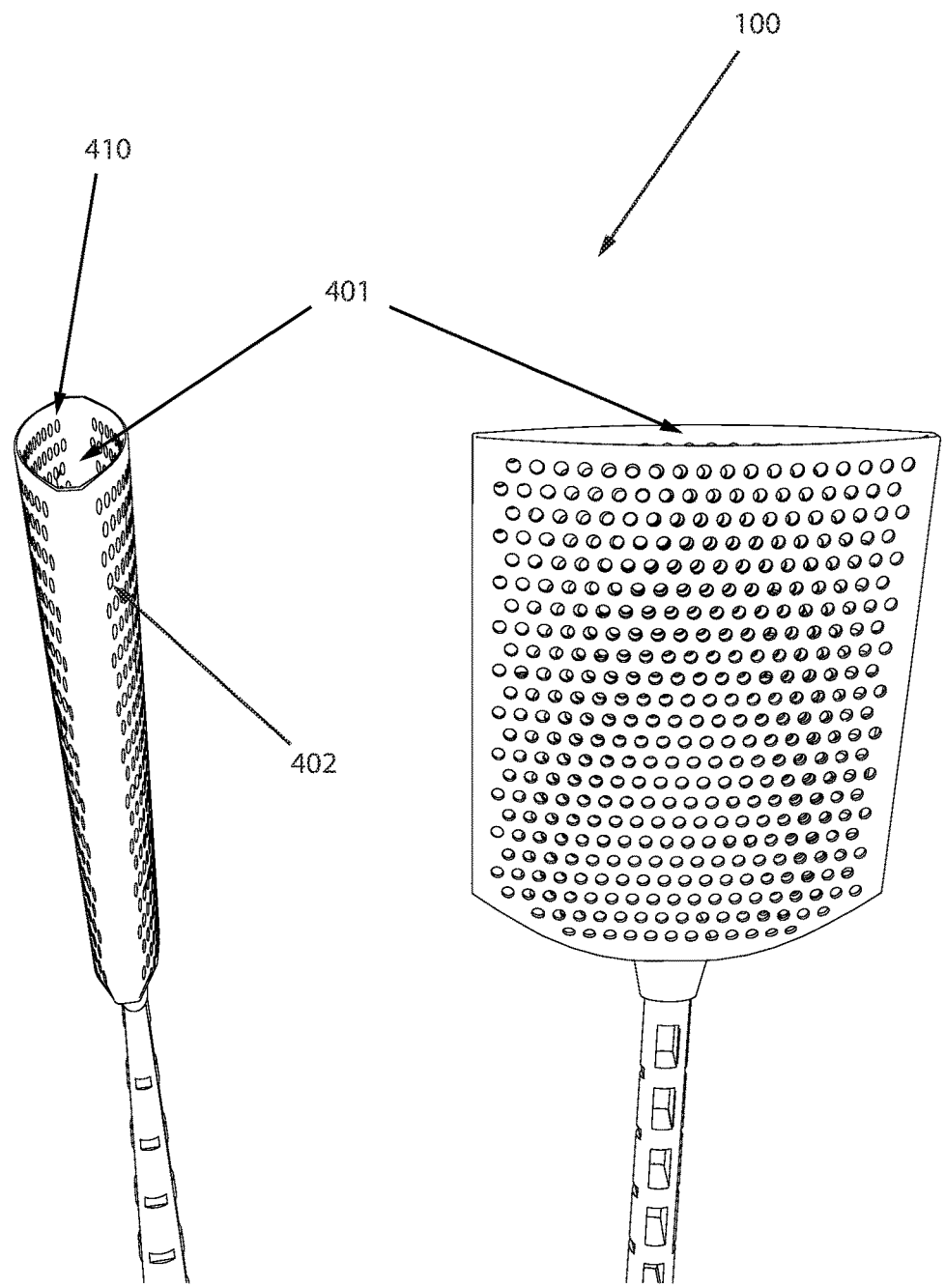
FIG. 4.—is a diagram illustrating a top and side view of a device for removing flies or other crawling organisms in accordance with an exemplary embodiment.
FIG. 4A shows a top view.
FIG. 4B shows a side view.

As shown in FIG. 4, a diagram is shown illustrating a top view FIG. 4A and side view FIG. 4B of a device 400 for removing flies and other flying or crawling organisms in accordance with an exemplary embodiment of the invention. As shown, the embodiment includes two sides, a first side 401, and a second side 402, creating a scoop or reservoir housing. The device 400 may include a symmetrical design as shown or an asymmetrical configuration as shown in FIG. 3. By way of example, the scoop/housing 410 may be substantially elliptical in shape. In one particular and illustrative, yet non-limiting, embodiment of the scoop mechanism 410 it may at its widest section be wide enough to accommodate a multitude of creatures. Additionally, it may have a box shape, rectangular, tapered, or non-tapered design and be any length that include the features described herein are intended to be within this disclosure and make up the overall invention, which has many different embodiments.

Figures 5, 5A, 5B:
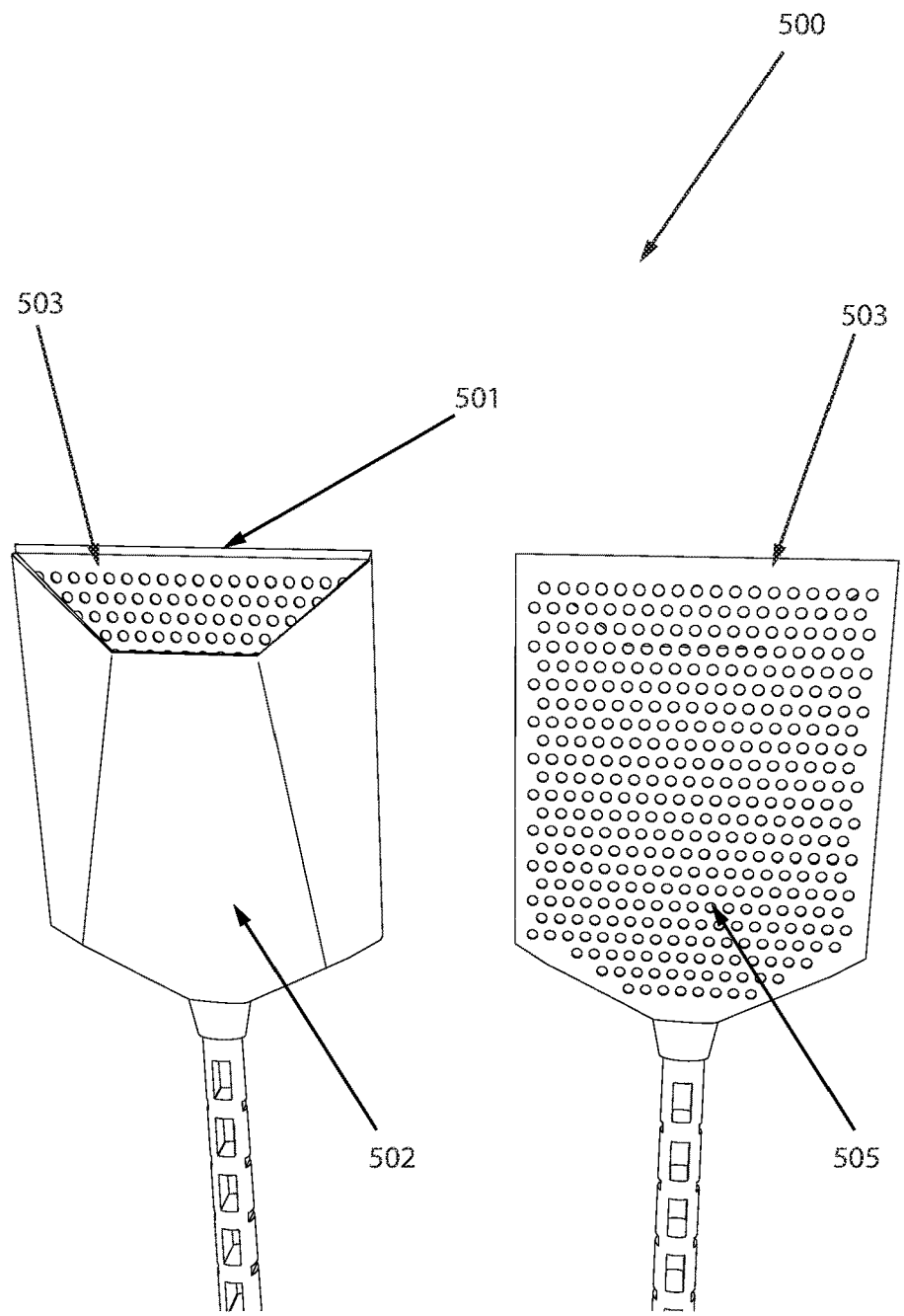
FIG. 5.—shows a front, and back perspective view of an alternative version of the invention with a geometric shaped first side.
FIG. 5A is a front view and FIG. 5B is a back view.

As shown in FIG. 5, a diagram is shown illustrating a front view FIG. 5A, and back view FIG. 5B of an optional design for a device for removing flies and other flying or crawling organisms in accordance with an exemplary embodiment of the invention. As shown, the embodiment includes a first side, 502, and a second side 503. The invention 500 includes a beveled or tapered edge 501, geometric shaped scoop first side 502 with housing of a solid, non-porous structure without holes within it, and may contain a porous design on the second side 503. By way of further illustration, the second side 503 is configured with holes 505 which may be any shape or size. Further, the embodiment may contain rounded or squared off corners and a tapered design of any configuration. Additionally, it may have a box shape, rectangular, tapered, or non-tapered design and be any length that include the features described herein are intended to be within this disclosure and make up the overall invention, which has many different embodiments.

Figure 6:
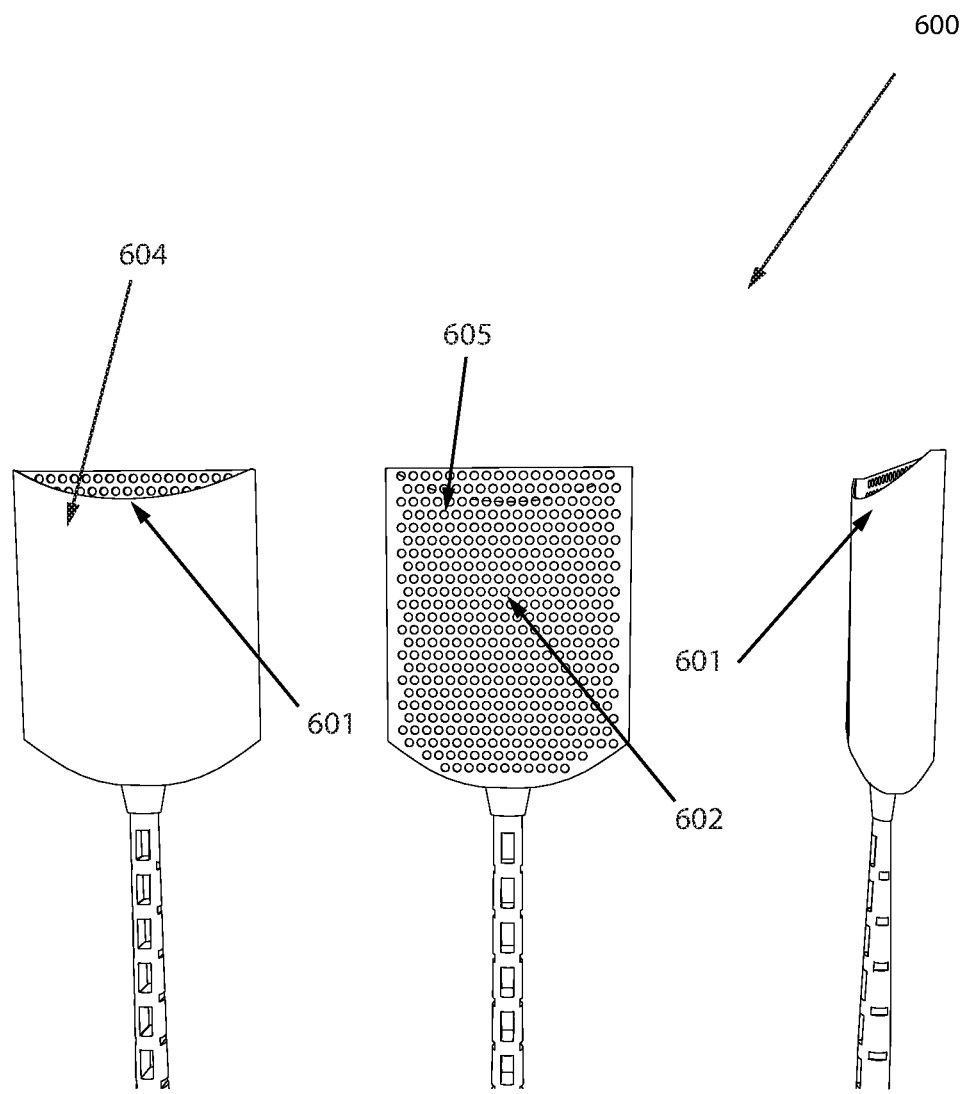
FIG. 6.—shows a front, back, and perspective view of a second alternative version of the invention.

As shown in FIG. 6, a diagram is shown illustrating a front view FIG. 6A, back view FIG. 6B, and side view FIG. 6C of an optional design for a device 600 for removing flies and other flying or crawling organisms in accordance with an exemplary embodiment of the invention. As shown, the embodiment includes a beveled or tapered edge similar to 501, curved scoop 601 with housing of a solid, non-porous structure of any dimension, or may contain a porous design with openings 602 on one or more sides, such as a first side 604 and a second side 605. By way of further illustration, the back side 605 is configured with openings 602 which may be any shape or size. Embodiment may or may not include a tapered back scoop 601, Further, the embodiment may contain rounded or squared off corners and a tapered design of any configuration. Additionally, it may have a box shape, rectangular, tapered, or non-tapered design and be any length that include the features described herein are intended to be within this disclosure and make up the overall invention, which has many different embodiments. It is noted that the device may alternatively be shaped as a diamond, a circle, an oval, or a polygon, or any other variation known in the art—the shape being selected based on the desired performance. The housing may be any shape or size scooping mechanism coupled with handle and method for trapping insects or other organisms, may include any size or shape holes in handle or scoop and may be decorative in nature or a specific shape for functional purposes. The device may be comprised of a material such as but not limited to: plastic, metal, poly, polyethylene, polypropylene, ABS, composite, rubber, wood, molded plastic, foam with a fiberglass coating, or any other variation known in the art.

Figure 7:
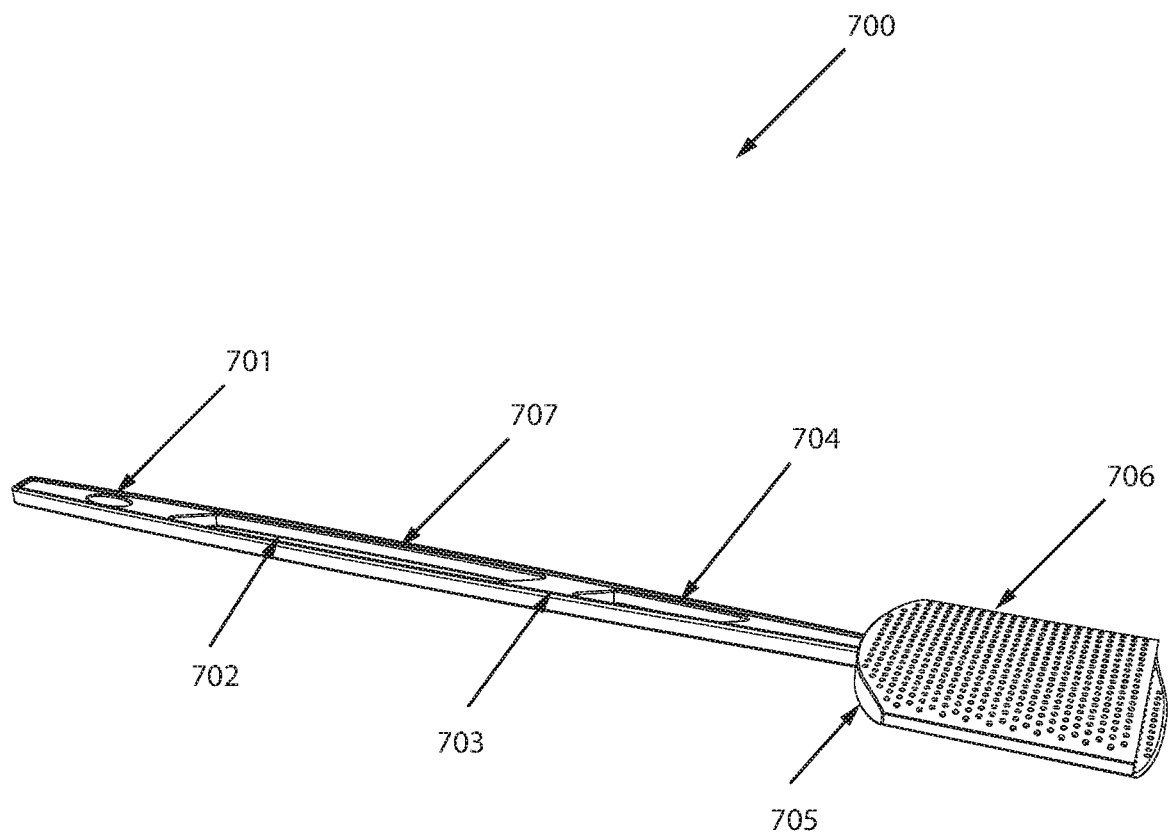
FIG. 7 shows another perspective view of an embodiment of the invention with a structural I-beam protrusion.

As shown in FIG. 7, a diagram is shown illustrating a perspective view of the device 700 for removing flies and other crawling organisms in accordance with an exemplary embodiment of the invention. As shown the embodiment includes one or more openings 701 of any shape or size for hanging the invention 100 for storage, additional opening 702 within handle 707, structural I-beam protrusion 703 within the handle 707. Additionally, embodiment includes one or more openings 704 within the handle 707 to reduce wind resistance and allow for multiple storage options. By way of example the embodiment handle is coupled with the head 706 including curved scoop 705 providing a funnel design to optimally move or channel bugs to the bottom of the storage chamber within the scoop 705.

Figure 8:
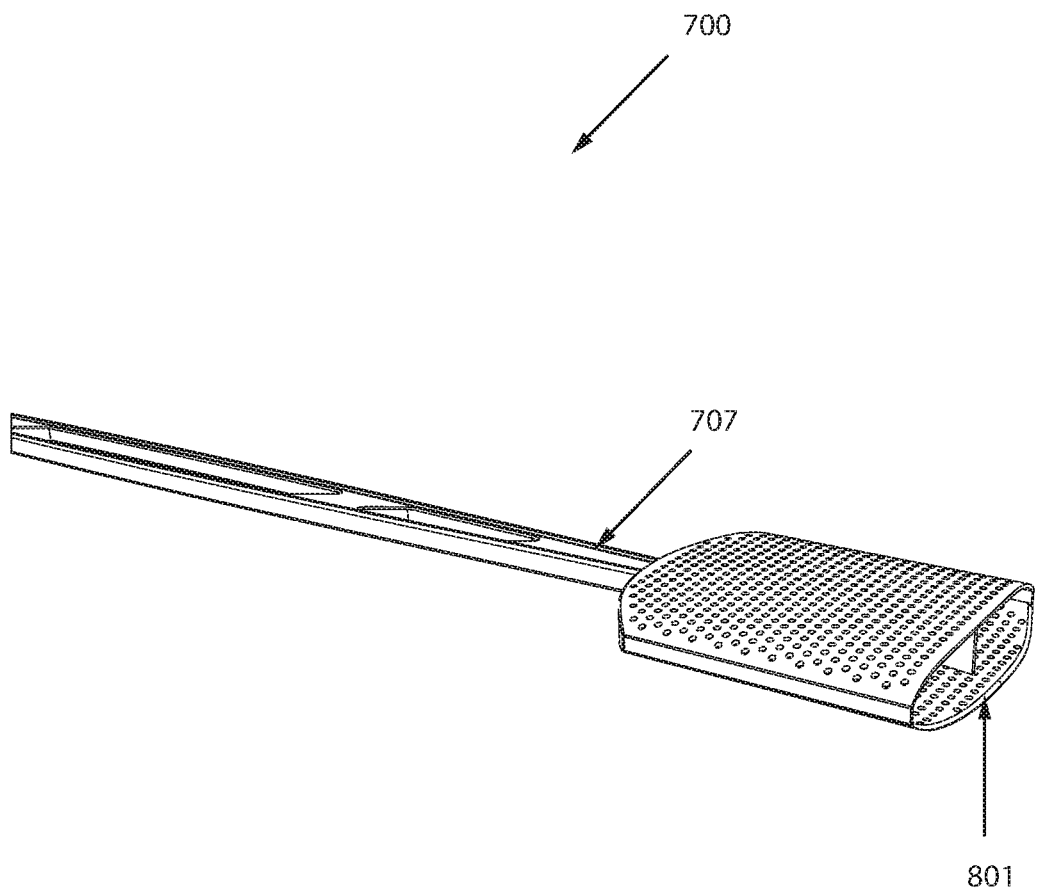
FIG. 8 shows another perspective view of an embodiment of the invention with beveled edges.

As shown in FIG. 8, a diagram is shown illustrating a perspective view of the device 700 for removing flies and other crawling organisms in accordance with an exemplary embodiment of the invention. As shown the embodiment includes one or more beveled edges 801 on one or more sides of the enclosure. By way of example the embodiment handle 707 may be solid or contain openings for any shape, size or orientation. It is also noted the handle may be an I-beam design for structural integrity which may include but not limited to outer protrusions in any configuration for strength.

Figure 9:
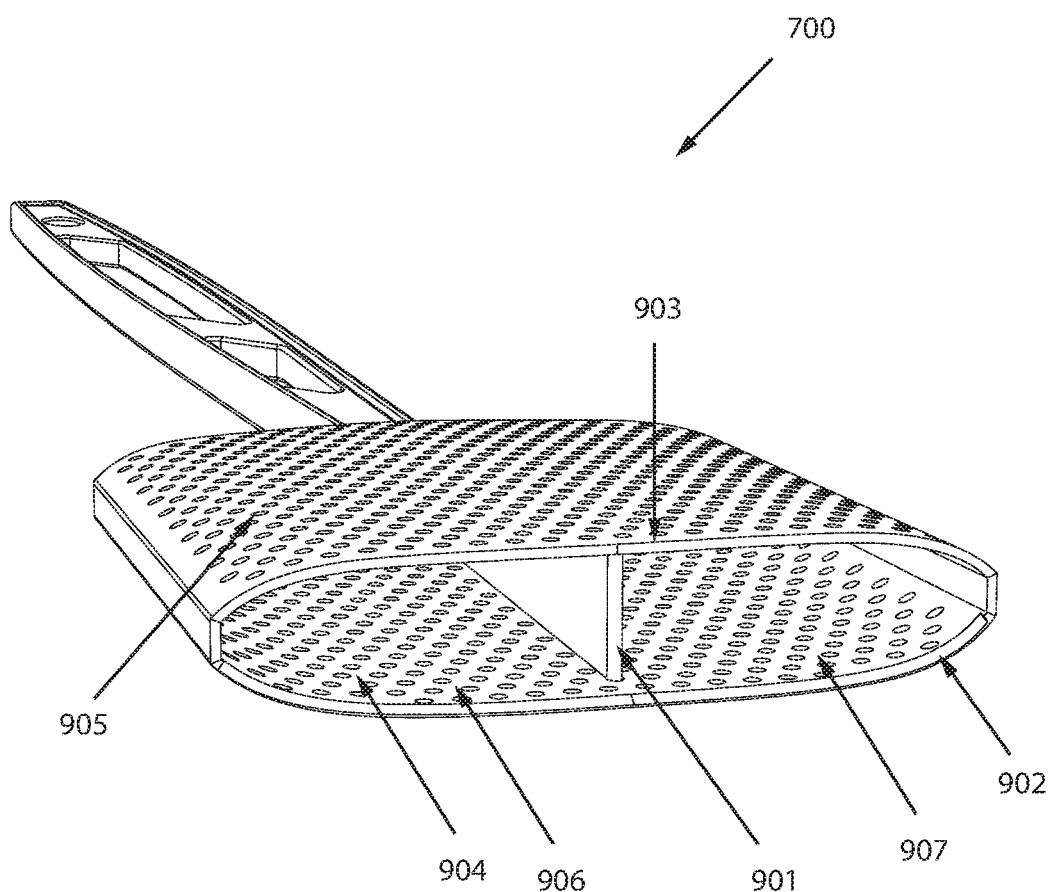
FIG. 9 shows another perspective view of an embodiment of the invention with a divider support.

As shown in FIG. 9, a diagram is shown illustrating a close-up view of a scoop or enclosure portion of a device 700 for removing flies and other crawling organisms in accordance with an exemplary embodiment of the invention. As shown the embodiment may or may not include one or more divider supports 901 which may or may not be removable, dividing the first side 904 and the second side 905 into multiple chambers such as a first chamber 906 and a second chamber 907. By way of example the embodiment first edge 902 and second edge 903, may or may not be beveled, scalloped, or otherwise designed for scooping or trapping animate or inanimate objects or organisms.

Figure 10:
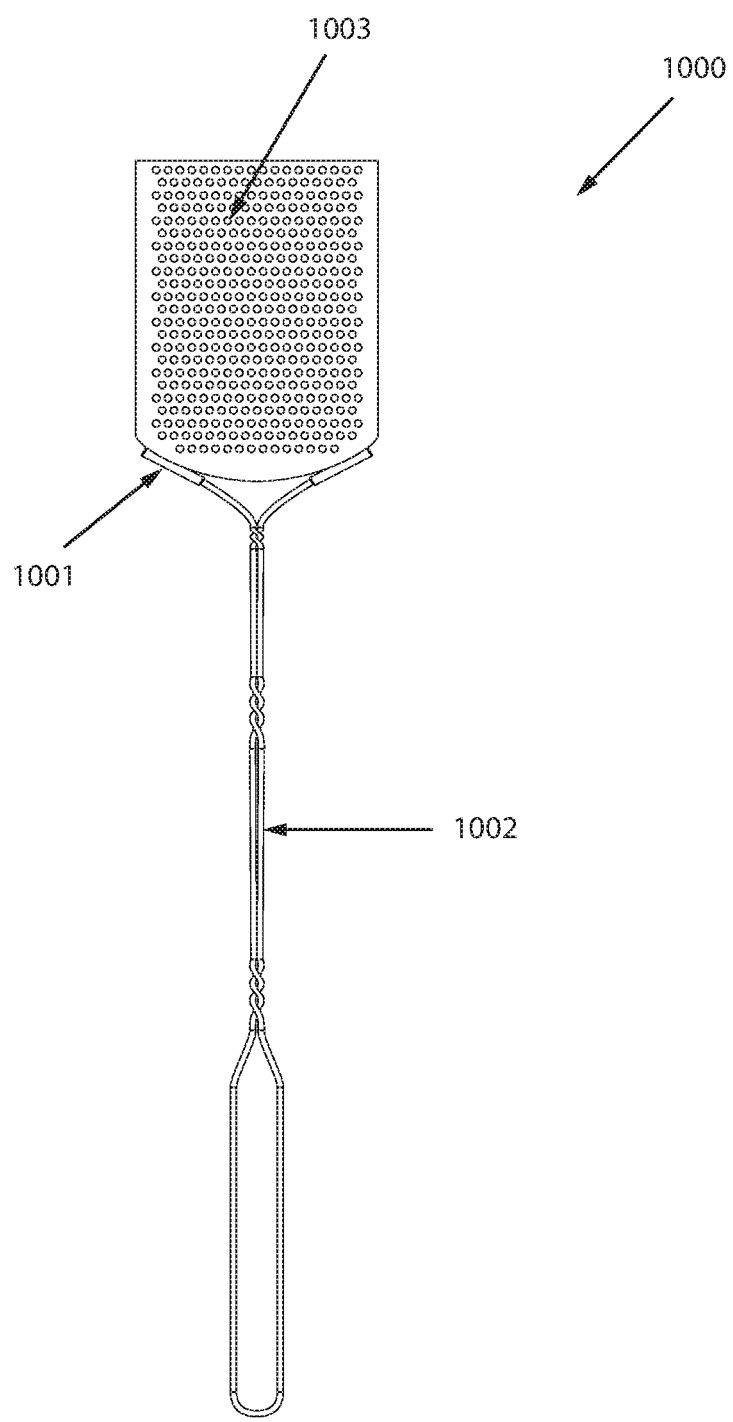
FIG. 10 shows a front view of an embodiment of the invention with a coupling mechanism.

As shown in FIG. 10, a diagram is shown illustrating a front view of an optional design for a device 1000 for removing flies and other flying or crawling organisms in accordance with an exemplary embodiment of the invention. As shown, the embodiment includes a coupling mechanism 1001 for the purpose of securing a wire handle 1002 to the scooping mechanism 1003, which may or may not be removable.

Figure 11:
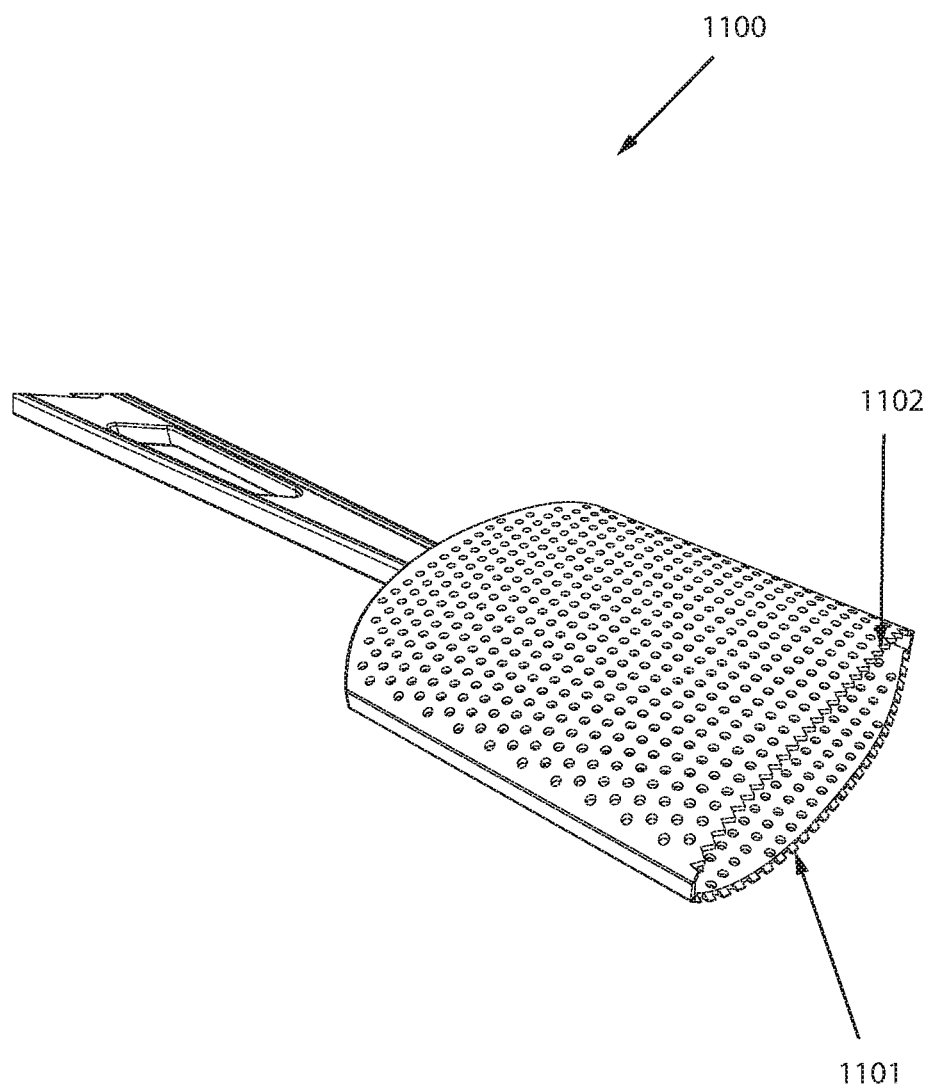
FIG. 11 shows another perspective view of an embodiment of the invention with saw-tooth edges on a top of the invention.

As shown in FIG. 11, a diagram is shown illustrating a ¾ view of a device 1100 for removing flies and other crawling organisms in accordance with an exemplary embodiment of the invention. As shown the embodiment includes one or more protrusions 1101 coupled with or built in, located along the edge of the housing, which allows for efficient scooping or collecting of animate or inanimate objects or organisms. Additionally, embodiment includes one or more saw-tooth edges 1102, along the opening of the housing. By way of example the embodiment head or scoop may include but not limited to one or more embodiments of various designs to aid in scooping, trapping, or collecting organisms, such as zig zag, flagstone, keystone, diamond edge, or any other variations known in the art.

Figure 12:
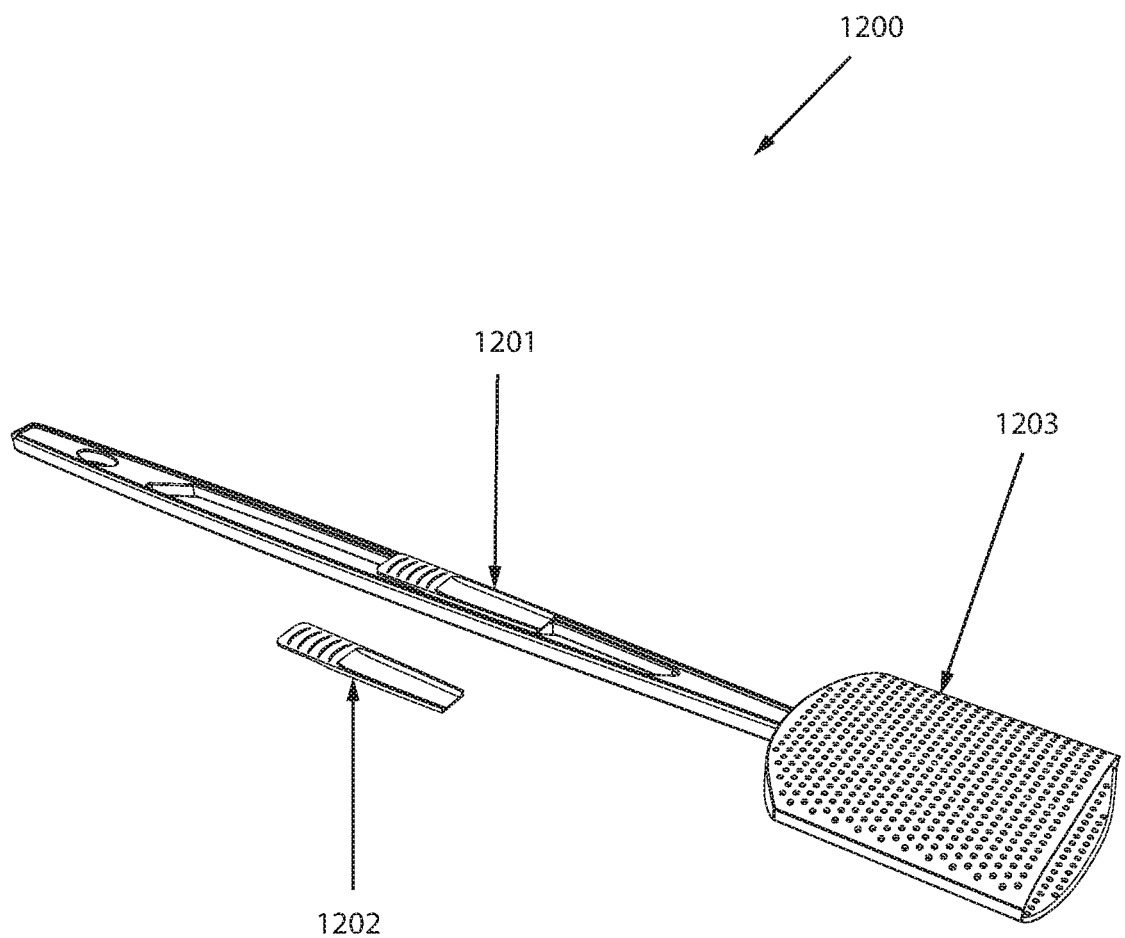
FIG. 12 shows another perspective view of an embodiment of the invention with a removable coupling mechanism.

As shown in FIG. 12, a diagram is shown illustrating a ¾ view of a device 1200 for removing flies and other crawling organisms in accordance with an exemplary embodiment of the invention. As shown the embodiment includes one or more collection devices, which may or may not be coupled with embodiment using a fitted coupling mechanism 1201, on one or more sides of the enclosure. 1202 shows the couple mechanism removed. Coupling mechanism may include but not limited to a pressure connector, snap in, clip in, magnetic system, or any other variations known in the art. By way of example the embodiment coupling mechanism 1202 may be solid or contain grips, slats, and openings for any shape, size or orientation, and is designed to push, flick, slide, broom, sweep, or otherwise expedite moving live or dead organisms into the scoop housing 1203.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. An insect swatter and insect remover, including: a dual sided top part having a first side and a second side, wherein the first side and the second side are sealed to one another along a continuous intersection from a top portion of the first and second side to and along a bottom portion of the first and second side and form a continuous wall on an interior and exterior of the top part, wherein the first side and the second side substantially mirror each other in one continuous piece; wherein the top part is without additional sides other than the first side and the second side connected to each other in the one continuous piece; wherein the first side and the second side are unconnected on the top portion of the first side and second side, forming a pocket; wherein the first side is slightly elongated in comparison to the second side; and wherein the insect remover includes a handle.

2. The insect remover of claim 1, wherein the first side and the second side include a beveled edge along the top portion of the first side and the second side.

3. The insect remover of claim 1, wherein the first side and the second side meet in a portion of the first side and the second side that is radiused.

4. The insect remover of claim 1, wherein at least one of the first side and the second side includes perforations.

5. The insect remover of claim 1, wherein a top portion of the pocket is greater in diameter than a bottom portion of the pocket.

6. The insect remover of claim 1, wherein the first side and the second side include a beveled edge along the top portion of the first side and the second side.

7. The insect remover of claim 1, wherein the first side and the second side meet in a portion of the first side and the second side that is radiused.

8. The insect remover of claim 1, wherein at least one of the first side and the second side includes perforations.

9. The insect remover of claim 1, wherein a top portion of the pocket is greater in diameter than a bottom portion of the pocket.

10. An insect swatter and insect remover, including: a dual sided top part having a first side and a second side, wherein the first side and the second side are sealed to one another along a continuous intersection from a top portion of the first and second side to and along a bottom portion of the first and second side and form a continuous wall on an interior and exterior of the top part, wherein the first side and the second side substantially mirror each other in one continuous piece; wherein the top part is without additional sides other than the first side and the second side sealed to one another in the one continuous piece; wherein the first side and the second side are unconnected on the top portion of the first side and second side, forming a pocket; and wherein the insect remover includes a handle.

\* \* \* \* \*